United States Patent

Yaguchi et al.

[11] 3,852,126
[45] Dec. 3, 1974

[54] GAS CUTTING METHOD

[75] Inventors: Hiromichi Yaguchi, Kameo Tachibana, Tetsuo Matsumoto, all of Tamanoshi, Okoyama, Japan

[73] Assignee: Mitsui Shipbuilding & Engineering Co. Ltd., Tokyo, Japan

[22] Filed: Aug. 11, 1972

[21] Appl. No.: 279,840

[30] Foreign Application Priority Data
Aug. 27, 1971 Japan.......................... 46/65755
Sept. 30, 1974 Japan.......................... 46/76535

[52] U.S. Cl................................................ 148/9 R
[51] Int. Cl............................................... B23k 7/00
[58] Field of Search......................................... 148/9

[56] References Cited
UNITED STATES PATENTS

| | | |
|---|---|---|
| 2,184,562 | 12/1939 | Rockefeller et al. ................... 148/9 |
| 2,288,026 | 6/1942 | Rea...................................... 148/9 |
| 2,443,710 | 6/1948 | Rountree.............................. 148/9 |
| 2,510,210 | 6/1950 | Bucknam et al........................ 148/9 |

Primary Examiner—W. Stallard
Attorney, Agent, or Firm—Dorfman, Herrell and Skillman

[57] ABSTRACT

A gas cutting method comprising an idle cutting method, the idle cutting nozzle is inclined to have a delay angle with the cutting direction to increase the cutting speed, the idle cutting nozzle is further deflected from the cutting direction.

7 Claims, 6 Drawing Figures

PATENTED DEC 3 1974    3,852,126
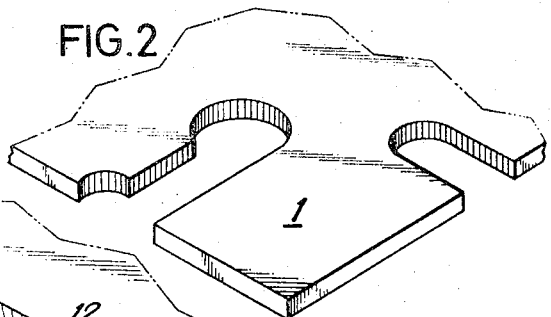
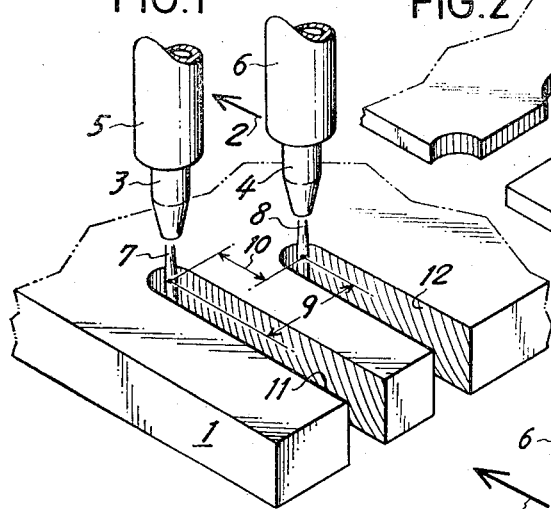
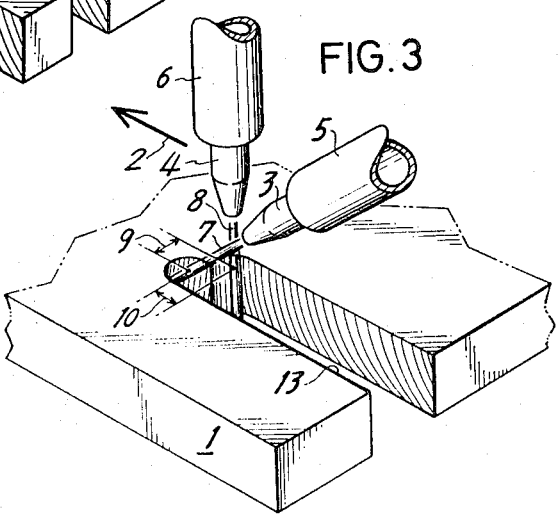
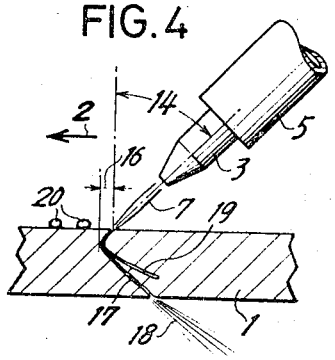
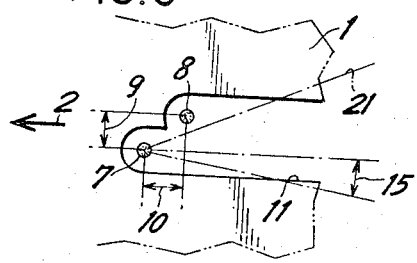
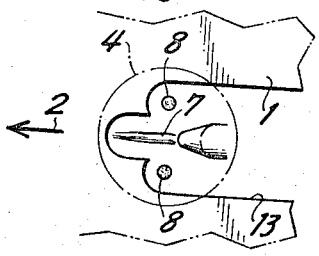

GAS CUTTING METHOD

This invention relates to a gas cutting method.

In general, when the gas cutting speed is increased, the conditions of the cut face are often found poor in flatness. In order to remove such disadvantage, idle cutting method is employed. According to this method, finishing cutting is performed by a cutting torch immediately after the temperature of a plate to be cut has been raised by cutting heat of the idle cutting.

The present invention is intended to provide an improved gas cutting method which can increase the cutting speed by effectively using heat generated by idle cutting.

The present invention will be better understood from the following description taken in connection with the accompanying drawings in which:

FIG. 1 is a perspective view showing a prior art of gas cutting method;

FIG. 2 is a perspective view showing a small round shape cutting;

FIG. 3 is a perspective view showing an embodiment of the cutting method according to the present invention;

FIG. 4 is a side view showing cutting condition according to the present invention;

FIG. 5 is a plane view showing a slot formed by a cutting operation in accordance with the present invention; and FIG. 6 is a plane view illustrating another embodiment of the present invention.

In FIG. 1 is shown an example of the idle cutting method where, as will be seen, according to the idle cutting method metal plate 1 is cut by idle cutting oxygen 7 of idle cutting nozzle 3 which advances before a finishing cutting nozzle 4 in the cutting direction indicated by the arrow 2. According to this method, a cut slot 11 is formed by oxygen 7 ejected from the idle cutting nozzle and a cut slot 12 by oxygen 8 from the finishing cutting nozzle 4. In this case, however, it is difficult to narrow either of the space 9 and distance 10 between the two cutting oxygen to less than several millimeters, because both nozzles 3 and 4 and their torches 5 and 6 are considerably large in diameter. Therefore, it was impossible to make full use of the heat generated during the idle cutting operation, and hence little improvement could be attained in the cutting speed according to the idle cutting method.

Further, since in this method the idle cutting nozzle is positioned vertical to the metal plate to be cut, there was also a certain limitation to the idle cutting speed and hence finishing cutting speed.

In addition, since the idle cutting nozzle is placed at a distance from the finishing nozzle, it is impossible to cut a small round shape as shown in FIG. 2.

The present invention is characterized in that the idle cuttong torch is inclined at a delay angle so that the idle cutting nozzle is positioned closely adjacent to the finishing cutting nozzle, and that the pressure of oxygen from the idle cutting nozzle or the relative position of the idle cutting nozzle to the finishing cutting nozzle is suitably adjusted so as to minimize any possible ill effect in small round shape cutting.

Referring to the drawings, in FIG. 3 there is shown an embodiment of the present invention, in which idle cutting is performed by an idle cutting nozzle 3 disposed to have a delay angle with the cutting direction shown by the arrow 2. Since the idle cutting nozzle 3 is inclined to have a delay angle with the cutting direction, it is easy to position the oxygen 7 from the idle cutting nozzle at a position near the oxygen 8 from the finishing cutting nozzle, and also, there is little possibility that the torch 5 for the idle cutting nozzle and the torch 6 for the finishing cutting nozzle are contacted with each other. The space 9 and distance 10 between the finishing cutting nozzle oxygen 8 and the idle cutting nozzle oxygen 7 can be selected at will with substantially no restriction, but in order to have the idle cutting effect, it needs that the nozzles are so positioned that the idle cutting oxygen 7 advances several millimeters ahead of the finishing cutting oxygen 8. Also, although the space 9 can not be made zero because certain spacing is required for preventing mutual interference of the two oxygens, it is desirable to decrease the space as small as possible by deflecting the direction of the idle cutting nozzle 3 by an angle of 2° to 10° obliquely relative to the cutting direction 2 as indicated by numeral 15 in FIG. 5 so that the slot 11 formed by idle cutting will partly overlap the slot 12 formed by the finishing cutting, whereby the compound slot 13 can be made smaller than the sum of said slots 11 and 12.

The idle cutting nozzle 3 secured to the torch 5 must also be provided to have a delay angle 14 relative to the cutting direction 2 as shown in FIG. 4. This delay angle 14 should preferably be within the range of 35° ± 15° because such range of angle can provide optimum relationship to the finishing cutting nozzle. The pressure of the oxygen 7 from the idle cutting nozzle 3 should be decided to have a value lower than the finishing cutting oxygen pressure. Desirably, the pressure of the oxygen 7 is of such a level that the idle cutting oxygen alone can not cut the entire thickness of the metal plate 1. Consequently, the cutting drag line of the oxygen 7 from the idle cutting nozzle will extend half of the thickness of the metal plate 1 as indicated by numeral 19, but actually, because the cutting is effected by the oxygen from the finishing cutting nozzle delayed behind the idle cutting nozzle, the actual idle cutting drag line runs the thickness of the metal plate as shown by numeral 17 and, resultantly, the oxygen shoots out rearwardly relative to the cutting direction as shown by numeral 18. As the idle cutting oxygen can not cut the metal plate, part of the un-oxidated molten iron produced by the idle cutting is blown back and flows into a section immediately beneath the finishing cutting nozzle and is oxidated by the oxygen from the finishing cutting nozzle, so that a greater amount of heat is generated than when the finishing cutting nozzle alone is used. In some cases, the portion of molten iron or molten iron oxide which was blown back may form balls 20 and be arranged in front of the slot. These balls serve to preheat the non-cut portion of the metal plate.

On the other hand, since the idle cutting oxygen is low in pressure and has an delay angle, the drag line 17 or 18 of the idle cutting oxygen 7 does not extend straight but is bent in V-shape, so that the length of advancing cutting 16 by the idle cutting oxygen can be confined within 2 to 3 millimeter. Accordingly, the advancing 10 of the idle cutting relative to the finishing cutting nozzle can be decreased in a short distance so as not to have ill effect on a small round cutting. Thus, according to the present invention, no problem rises over the cutting shape and cutting size in normal cutting if the idle cutting torch can be revolved about the finishing cutting nozzle in such a way that the idle cutting nozzle is always directed in the direction of cutting.

The above-mentioned method is to have no detrimental effect on cutting by restricting the amount of cut-in of the drag line of the idle cutting by reducing the cutting pressure of oxygen from the idle cutting nozzle. In an alternate method, the angle 15 (see FIG. 5) which is made by the idle cutting nozzle with the cutting direction may be reduced to 0° or to −25° ± 10°. In other words, the idle cutting nozzle is directed toward the cut out side of the cutting direction as shown by numeral 21 in the case of FIG. 5. In this case, idle cutting does not exert aggravating influence upon finish cut face even if the acting pressure of oxygen from the idle cutting nozzle is increased up to a level sufficient to allow cutting off the plate, because the idle cutting is mainly performed in the cut out side of the metal plate.

FIG. 6 shows another embodiment of the invention where the finishing cutting nozzle 4 has two jets of oxygen 8 and an idle cutting oxygen 7 being positioned in the middle of said oxygen jets 8, whereby the similar effect to those described above can be obtained. According to this system, excellent cutting face can be obtained since both sides of the slot 13 are not influenced by the idle cutting.

In the foregoing have been discussed the embodiments in which the finishing cutting nozzle and the idle cutting nozzle are provided separately from each other, but it is possible to integrate these nozzles into a single nozzle assembly. The latter case is preferred in practical use because the positional relation between nozzles is fixed.

From the foregoing, it will be understood that the present invention provide an improved gas cutting method whereby gas cutting speed may be increased since the idle cutting is performed with a delay angle and the finishing cutting is performed in the overlaping relation to the idle cutting. Further, owing to the fact that the idle cutting and the finishing cutting can be performed in extremely close contiguity, the present method can be as effectively employed for the small round shape cutting.

What is claimed is:

1. A method of gas cutting a metal plate with two nozzles, each of which is adapted to project a jet of oxygen, the first of said jets performing an idle cut and the second of said jets performing a finish cut, the cutting being performed by advancing said nozzles along a line in a selected direction of cutting, the improvement comprising the steps of projecting said first jet from its nozzle at a selected delay angle relative to the cutting direction to thereby impinge said first jet against said plate at said selected angle, projecting said second jet against said plate alongside the path of the first jet so that the cutting slots produced by said jets overlap laterally, and positioning said idle cutting nozzle behind said finish cutting nozzle in the line of cutting so that the jet from said idle cutting nozzle projects past the finish cutting jet prior to impinging against the plate in the line of cutting without contacting the finish jet with the idle jet whereby said idle cutting jet impinges against the plate no more than several millimeters in the direction of cutting in front of the point where the finish cutting jet impinges against the plate.

2. A method according to said claim 1 wherein said selected delay angle is 35°± 15°.

3. A method according to claim 2 wherein the line of the first jet is also disposed at a lateral angle to the direction of cutting.

4. A method according to claim 3 wherein said lateral angle effects impingement of the first jet against the plate in front of the second jet.

5. A method according to claim 3 wherein said lateral angle directs the first jet to impinge against the plate away from in front of the second jet.

6. A method according to claim 1 wherein the pressure of the oxygen in the first jet is low pressure to create a V-shaped drag line which effects a blow-back of a part of the un-oxidized molten metal produced by said first jet into the path of the second jet for oxidation thereby.

7. A method according to claim 1 including a third jet of oxygen for effecting finish cutting, said third jet being disposed parallel to said second jet and located on the opposite side of said first jet so that its cutting slot overlaps the cutting slot of the first jet, said second and third jets effecting finish cutting of the opposite sides of the composite slot produced by said three jets.

* * * * *